United States Patent [19]

Hirayama et al.

[11] Patent Number: 5,832,201
[45] Date of Patent: Nov. 3, 1998

[54] METHOD AND APPARATUS FOR A CHECKPOINT BASED COMMUNICATION PROCESSING SYSTEM

[75] Inventors: Hideaki Hirayama, Kanagawa-ken; Makoto Honda, Tokyo, both of Japan

[73] Assignee: Kabushiki Kaisha Toshiba, Kawasaki, Japan

[21] Appl. No.: 660,930

[22] Filed: Jun. 10, 1996

[30] Foreign Application Priority Data

Jun. 19, 1995 [JP] Japan ..................................... 7-151734

[51] Int. Cl.$^6$ ....................................................... G06F 13/00
[52] U.S. Cl. ........................................................ 395/182.11
[58] Field of Search ........................ 395/182.11, 182.13, 395/182.14, 182.16, 600, 185.02, 185.03, 185.01

[56] References Cited

U.S. PATENT DOCUMENTS

| | | | |
|---|---|---|---|
| 5,043,866 | 8/1991 | Myre et al. .............................. | 364/200 |
| 5,418,940 | 5/1995 | Mohan et al. ........................... | 395/575 |
| 5,455,946 | 10/1995 | Mohan et al. ........................... | 395/600 |
| 5,485,608 | 1/1996 | Lomet et al. ............................ | 395/600 |
| 5,555,371 | 9/1996 | Duyanovich et al. ............. | 395/182.11 |

OTHER PUBLICATIONS

Netzer et al., Sender–based Message Logging, 1995, pp. 602–608. IEEE.
Netzer et al., Adaptive Message Logging, 1993 pp. 32–38.
Wang, Y; Ming, et al., "Checkpoint Space Reclamation for Uncoordinated Checkpointing in Message–Passing Sys.," IEEE Transactions on Parellal & Distributed Systems," vol. 6, No. 5, pp. 546–554, May 1995.
Wang, Y; Ming, et al., "Consistant Global Checkpoints Based on Direct Dependency Tracking," Information Processing Letters vol. 50, No. 4, pp. 223–230, 25 May 1994.
Wang, Y; Ming, et al., "Optimistic Message Logging for Independent Checkpointing in Message Passing Systems," Reliable Distributed Systems, 11$^{th}$ Symposium, pp. 147–154. IEEE, 1992.

Primary Examiner—Robert W. Beausoliel, Jr.
Assistant Examiner—Norman M. Wright
Attorney, Agent, or Firm—Oblon, Spivak, McClelland, Maier & Neustadt, P.C.

[57] ABSTRACT

A checkpoint based communication processing system and method in which an operation is executed and during execution checkpoints are periodically taken in order to recover from a failure which may be detected in the operation between any two checkpoints. Communication processing is controlled in accordance with a send-to-request instruction from an application. A plurality of communication packets for the communication processing are generated and a sequence numbered for a checkpoint is incremented each time when a checkpoint has periodically been taken during the operation. Affixed to each communication packet is attribute information in the form of the checkpoint sequence number existing at the time of generation of the communication packet, with plural communication packets generated between incrementing of the sequence number having affixed thereto the same sequence number. Whether or not the communication is promptly transferred is determined based on a comparison of the fixed attribute information and the latest sequence number. In another embodiment, the attribute information indicates whether or not the packet is the last of the generated of the plurality of transfer packets, and transfer packets fixed with attribute information which does not indicate the last position is transferred immediately, but the transfer packet which has affixed attribute information indicating the last position is delayed in transmission until a next checkpoint has been taken.

4 Claims, 7 Drawing Sheets

METHOD AND APPARATUS FOR A CHECKPOINT BASED COMMUNICATION PROCESSING SYSTEM

BACKGROUND OF THE INVENTION

1. Field of the Invention

The present invention relates to a method and apparatus for a checkpoint based communication processing system suitable for application to a fault tolerant computer system.

In particular, the present invention relates to a method and apparatus for achieving a higher speed communication processing system which is suitable for application to a checkpoint based fault tolerant computer system.

More particularly, the present invention relates to a method and apparatus for accomplishing a higher efficiency of a checkpoint based communication processing system while maintaining the fault tolerance of the system.

Further more particularly, the present invention relates to a method and apparatus for accomplishing a checkpoint based communication processing system which performs an information transfer by using a plurality of communication packets with taking a checkpoint for avoiding a failure.

2. Discussion of the Background

A checkpoint based fault tolerant computer system proceeds with execution of a program by taking a checkpoint periodically for recovering from a failure which appears between two particular checkpoints.

When a fault or failure is detected, the execution rolls back to the prior checkpoint of the particular two checkpoints and restarts the execution to recover from the failure.

Figure 7:
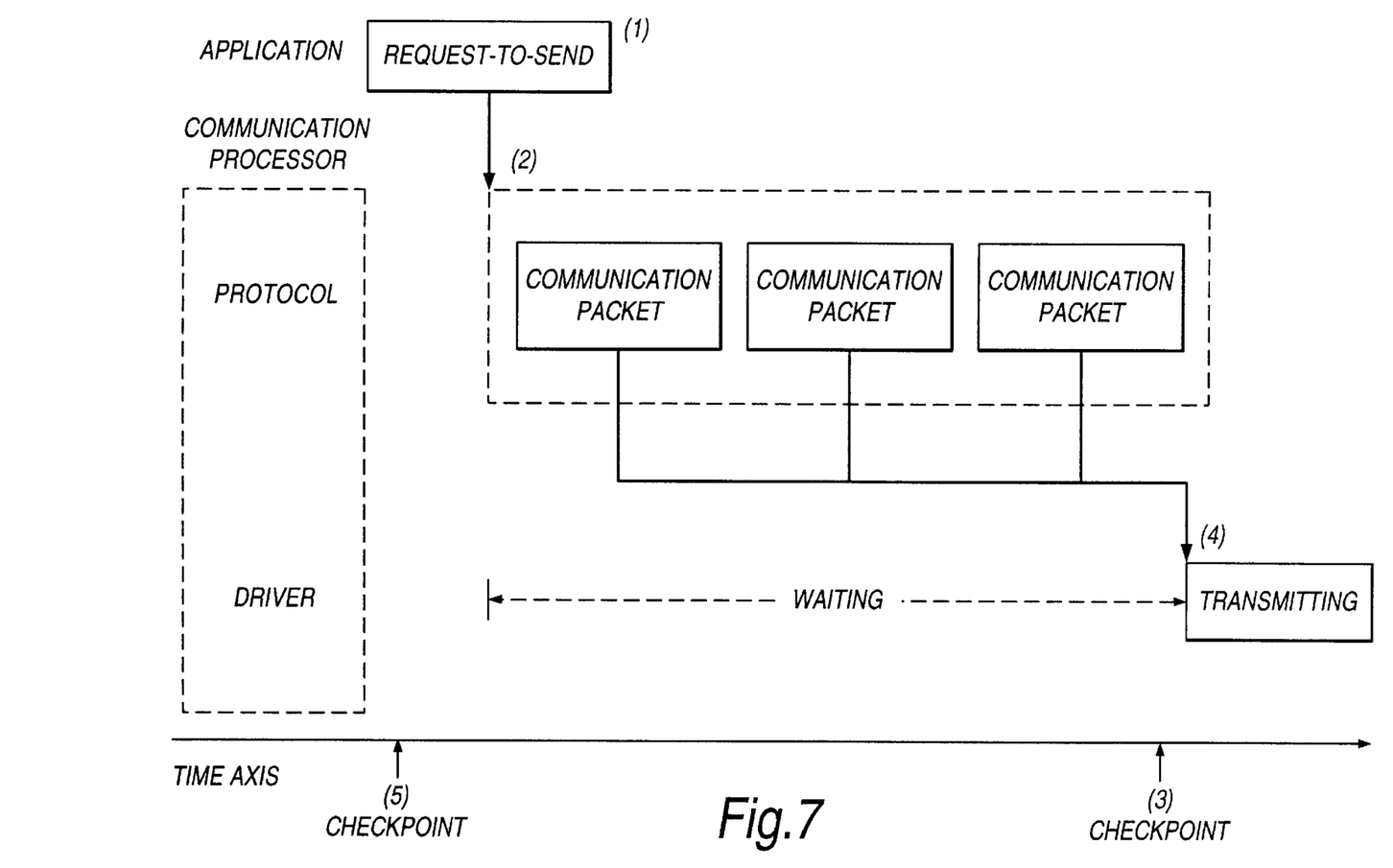
FIG. 7 is a timing chart for explaining a conventional operation for the checkpoint based communication processing system.

A checkpoint based communication processing system which is applied to a fault tolerant computer system also proceeds in the substantially same way. FIG. 7 is a timing chart for explaining the transfer operation of the checkpoint based communication processing system. When a request-to-send instruction (1) is provided to the communication processing system, the system generates a plurality of communication packets (2) to be transferred. However, the actual transfer of the generated communication packets is delayed until the execution between the two checkpoint (3A) and (3B) has been completed without detecting any failure. After a completion of the execution between the two checkpoints, the transfer (4) of the communication is performed.

The reason for delaying the transfer of the communication packets is to detect a possible appearance of a failure between the execution. That means there is some possibility for cancelling the generated communication packets if a failure is detected until the completion of the execution at the next checkpoint. If the communication packets have been transferred before taking the next checkpoint, it is impossible to cancel them when a failure is detected before the next checkpoint.

Conventionally, an actual transfer of the generated communication packets must wait or be delayed until the completion of execution between the two particular checkpoints. This causes the deterioration of the efficiency the communication processing system and the latency of the checkpoint based communication processing system.

Recently, a high system fault tolerance is requested. And a higher efficiency or a higher speed of the communication processing is also highly requested to achieve a communication processing system. In order to do so, it is inevitable to transfer the communication packets as promptly as possible when they are generated.

However the conventional communication processing system can not transfer the communication packet promptly after the generation, as above mentioned.

SUMMARY OF THE INVENTION

Accordingly, it is an object of the present invention to provide a method and apparatus for achieving a higher efficiency of a checkpoint based communication processing system while maintaining a fault tolerance of the system.

It is another object of the present invention to provide a method and apparatus for transferring the communication packets as promptly as possible after their generation while maintaining the fault tolerance of the checkpoint based communication processing system.

It is a further object of the present invention to provide a method and apparatus for improving the latency of the conventional communication processing system and achieving a higher efficiency of the checkpoint based communication system by minimizing the number of the delayed communication packets.

It is a still further object of the present invention to provide method and apparatus for achieving a higher speed communication processing system which is suitable for applying to a checkpoint based fault tolerant computer system.

A checkpoint based communication processing system according to the present invention can achieve a higher efficiency of the system while maintaining a fault tolerance of the system by processing attribute information affixed to a plurality of communication packets or transfer packets for transferring promptly so as to minimize the number of the packet waiting until a completion of execution of two particular check points.

A sequence number of a taken checkpoint and a relative positioning information are used as the attribute information. The system includes a judging means whether a packet should be transferred as promptly in accordance with the attribute information affixed to the packet.

A first embodiment of the checkpoint based communication processing system in accordance with the present invention uses a sequence number of the checkpoint taken during an execution as an attribute information for judging whether or not the affixed communication packet should be transferred as promptly.

A second embodiment of the checkpoint based communication processing system in accordance with the present invention uses a relative information among a plurality of transfer packets which are generated from a communication packet as an attribute information for judging whether or not a transfer packet should be transferred as promptly.

The first checkpoint based communication processing system in accordance with the present invention comprises means for controlling a total operation for a communication processing in accordance with a send-to-request instruction from an application, means for generating a plurality of communication packets under an instruction from the means for controlling, means for incrementing a sequence number for a checkpoint each time when a checkpoint has periodically been taken during an execution, means for affixing an attribute information to the respective communication packets, wherein the sequence number which is retained in the means for incrementing at a time for generation of the communication packet is used as the attribute information, and means for comparing the affixed attribute information and the latest sequence number which is retained in the means for incrementing at the time for an actual transfer of the communication packet, whereby the means for controlling instructs a prompt transfer of the communication packet from the system if the means for comparing judges that the attribute information affixed to the communication packet does not coincide with the sequence number which is retained in the means for incrementing at the time for the actual transfer.

The first method for achieving a checkpoint based communication processing system in accordance with the present invention includes the steps of generating a plurality of communication packets in accordance with an instruction from a controller, incrementing a sequence number for a checkpoint each time when a checkpoint has been taken periodically, affixing an attribute information to the communication packet by applying the sequence number of the checkpoint which has been taken to an incrementing means at the time of the generation of the communication packet, comparing the attribute information and the latest sequence number of the checkpoint at the time for an actual transfer of the communication packet from the system and transferring the communication packet promptly if the attribute information does not coincide with the latest sequence number at the time for the transfer and to perform the transfer of the communication packet until the next checkpoint has taken if it does.

The second checkpoint based communication processing system in accordance with the present inventions comprises means for controlling processes for a communication processing, means for generating a plurality of communication packets for transferring in accordance with an instruction control from the means for controlling, means for generating a plurality of transfer packets from the respective communication packet by dividing a communication packet under a particular communication protocol, and means for affixing an attribute information to the respective transfer packet, wherein the attribute information indicates a relative position of a transfer packet among the plurality of the transfer packets for identifying a particular position of the transfer packet, whereby, the means for controlling instructs to perform an actual transfer of a transfer packet promptly if the attribute information for the transfer packet does not indicate a certain particular position, and also the means for controlling instructs to wait to perform a transfer of the transfer packet until a next checkpoint has been taken in the means for incrementing if the attribute information indicates the certain particular position.

The last position among the plural generation of the transfer packets is usually used as the certain particular position.

The second method of a checkpoint based communication processing system in accordance with the present invention includes the steps of, generating a plurality of communication packets in accordance with an instruction from a controller, generating a plurality of transfer packets from the respective communication packet by dividing a communication packet under a particular communication protocol, affixing an attribute information to each of the transfer packets, the attribute information indicates a relative position for a transfer packet among the plurality of transfer packets, and transferring the transfer packet promptly if the attribute information does not indicate a special position, and instructing the transfer packet to wait until a next checkpoint has been taken if the attribute information indicates the special position.

DETAILED EXPLANATION OF THE PREFERRED EMBODIMENTS

Figure 1:
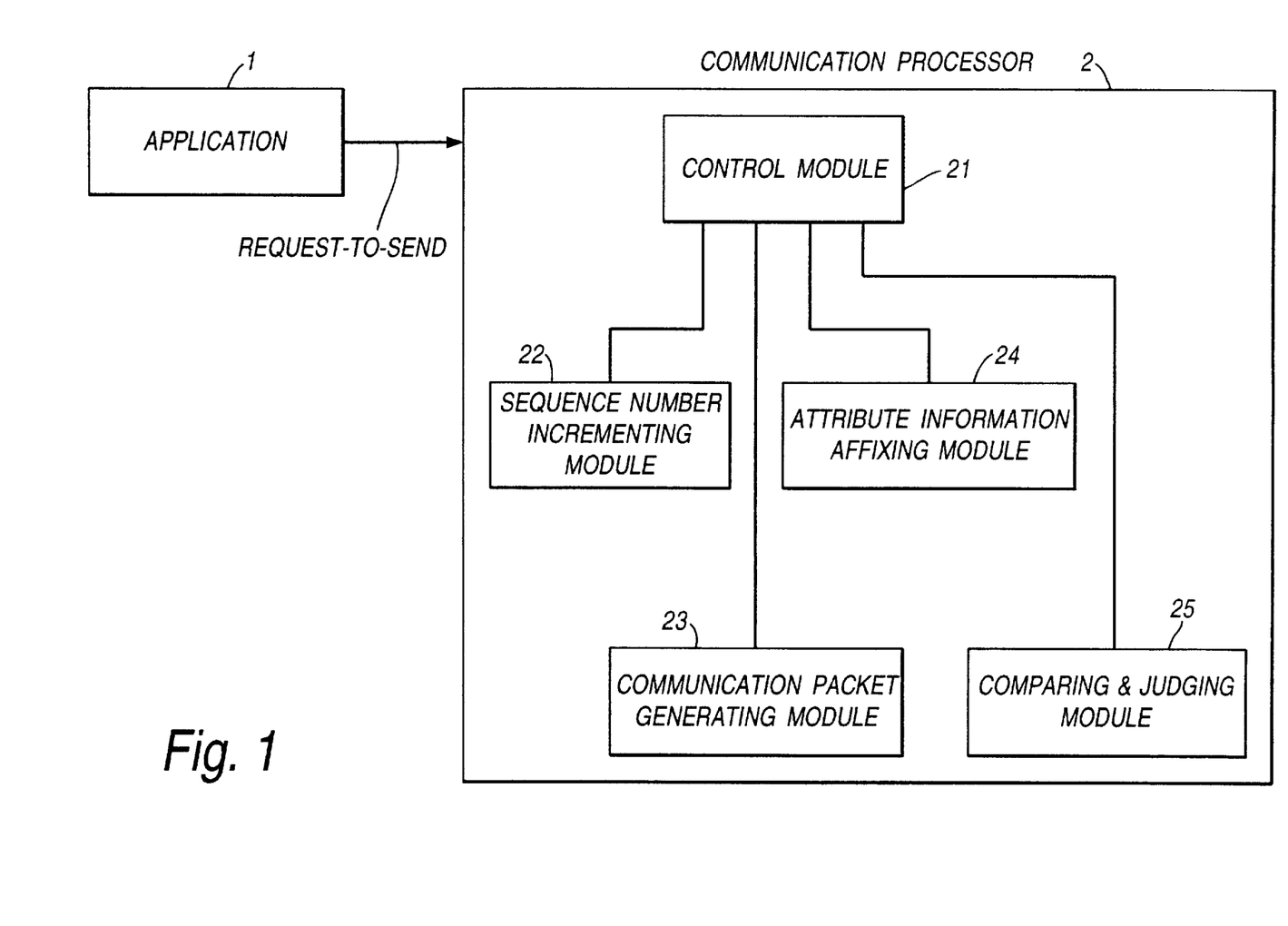
FIG. 1 is a schematic diagram of one preferable embodiment of the checkpoint based communication processing system according to the present invention.
Figure 2:
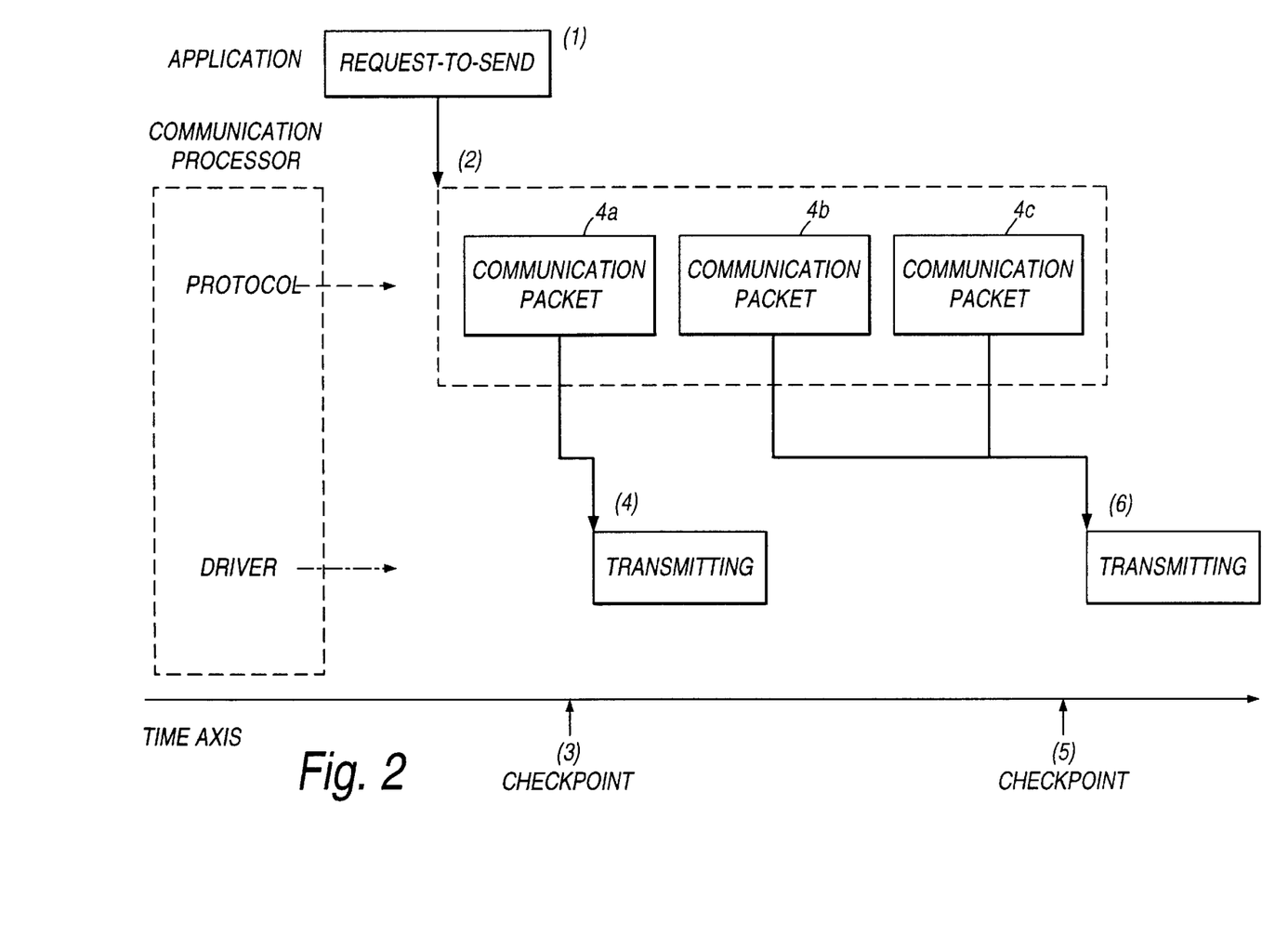
FIG. 2 is a timing chart for explaining the operational principle of the first embodiment of the checkpoint based communication processing system according to the present invention in FIG. 1.
Figure 3:
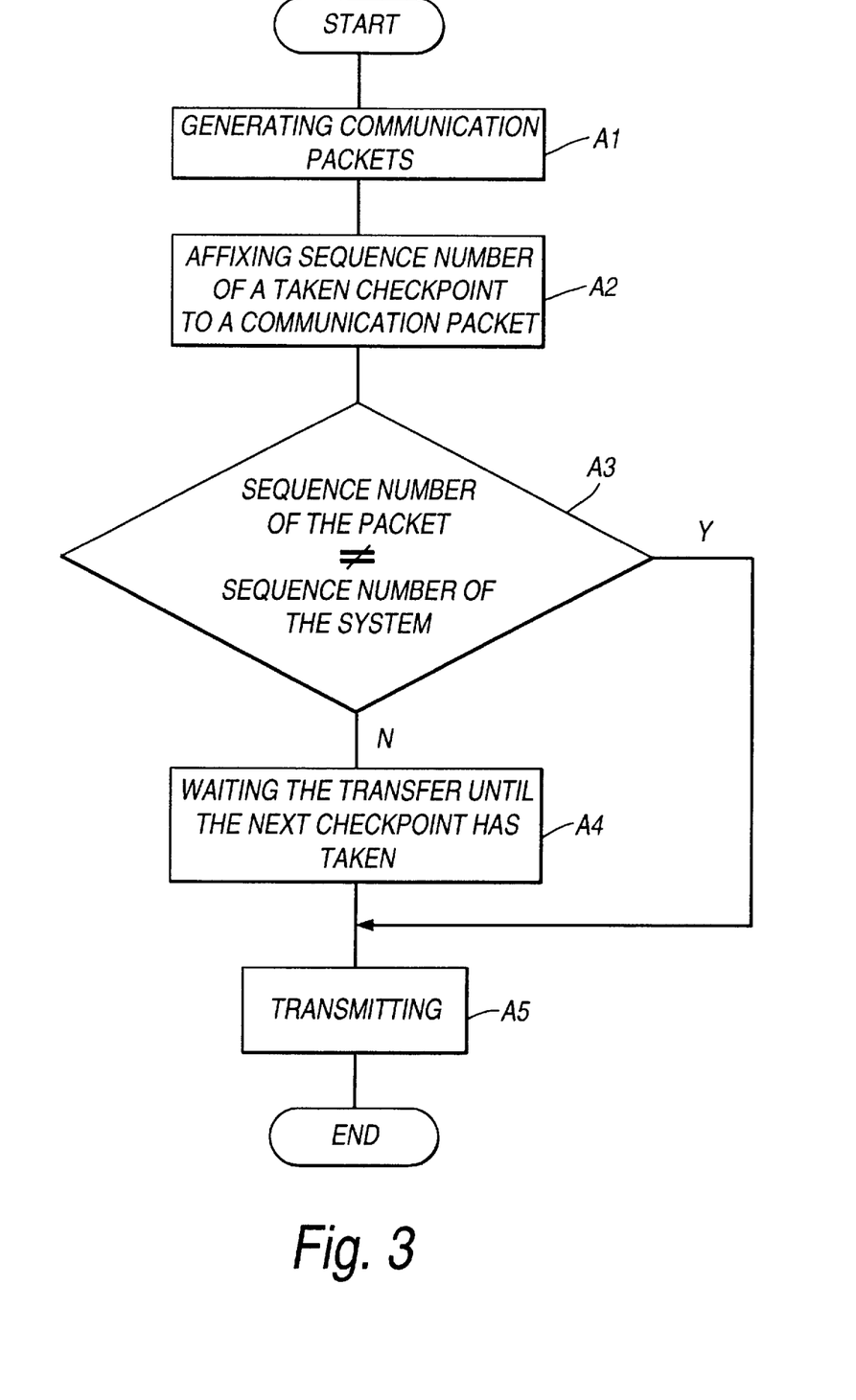
FIG. 3 is a flow chart for explaining the first method for achieving a checkpoint based communication processing system of a higher efficiency according to the present invention in FIG. 2.

With reference to FIGS. 1, 2 and 3, the first preferable embodiment of apparatus and method for a checkpoint based communication system according to the present invention is explained.

FIG. 1 is a schematic diagram of one preferable embodiment of a checkpoint based communication system according to the present invention. The checkpoint based communication system 2 includes a control means 21, an incrementing means 22, a generating means 23, an affixing means 24, and a comparing means 25.

The control means 21 (hereinafter referred to as a control module) controls the total operation of the checkpoint based communication system 2. The incrementing means 22 (hereinafter referred to as a sequence number incrementing module) increments and holds a sequence number of a checkpoint at every time the respective checkpoint is taken periodically at a certain time interval for identifying the respective checkpoint.

The generating means 23 (hereinafter referred to as a packet generating module) generates a plurality of communication packets in accordance with a send-to-request from an application 1 for the system 2. The communication packet means a transport packet in a transport layer, like an IP packet.

When the packet generating module 23 generates a communication packet, the affixing means 24 (hereinafter referred to as an attribute information affixing module) affixes the sequence number of the checkpoint which has held in the sequence number incrementing module 22 at that time to the communication packet.

For transferring a communication packet, the comparing means 25 (hereinafter referred to as a comparing and judging module) compares the attribute information attached to the communication packet and a sequence number for the checkpoint which has lastly taken at the time for a transfer.

With reference to FIG. 2, the operational principle of the above mentioned embodiment is explained. FIG. 2 is a timing chart for explaining the operation. When a send-to-request is provided from an application 1, the control module in the communication processing system instructs the packet generating module to generate a plurality of communication packets 4a, 4b and 4c at the point (2). The generated numbers of the communication packets are just shown as an example for the explanation purpose only. Of cause, it does not mean the actual number of the generated communication packets.

In this example case, a checkpoint (3) is taken just after generation of the communication packet 4a. For transferring the communication packets, the control module provides an instruction signal to the comparing module for checking whether or not the attribute information affixed to the communication packet coincides with the sequence number of the checkpoint maintained in the incrementing module.

When the comparing module judges that the attribute information affixed to the communication packet is different from the sequence number in the incrementing module at that time for a transfer (as shown at the point (4)), the control module instructs to transfer the communication packet 4a promptly through a driver.

In this example, the attribute information affixed to the respective communication packets 4b and 4c coincide with the sequence number of the checkpoint in the incrementing module. Accordingly, transmission of the communication packets 4b and 4c is delayed from the system until the next checkpoint has been taken.

As explained before, the first embodiment of the present invention is characterized in that the number of the generated communication packets is decreased by judging the attribute information affixed to the communication packet and the sequence number in the increment module.

FIG. 3 is a flow chart for explaining a method for the first embodiment. When an application issues a send-to-request to the communication processing system as a first step A1, the control module instructs to generate a plurality of communication packets.

At the second step A2, the control module instructs the affixing module to affix the sequence number maintained in the incrementing module as an attribute information at the time when the communication packets were generated.

At the third step A3, the control module instructs the comparing module to check whether or not the affixed attribute information coincide with the sequence number of the checkpoint maintained in the incrementing module at the present time for actually transferring the communication packets.

If the comparing module judges that the attached attribute information does not coincide with the present sequence number of the checkpoint, the control module instructs to transfer the communication packet having the attribute information promptly from the system through a driver as shown at the fifth step A5. If the attached attribute information coincides with the present sequence number of the checkpoint, the transfer of the communication packet is delayed until the next checkpoint has taken as indicated at the fourth step A4.

Figure 4:
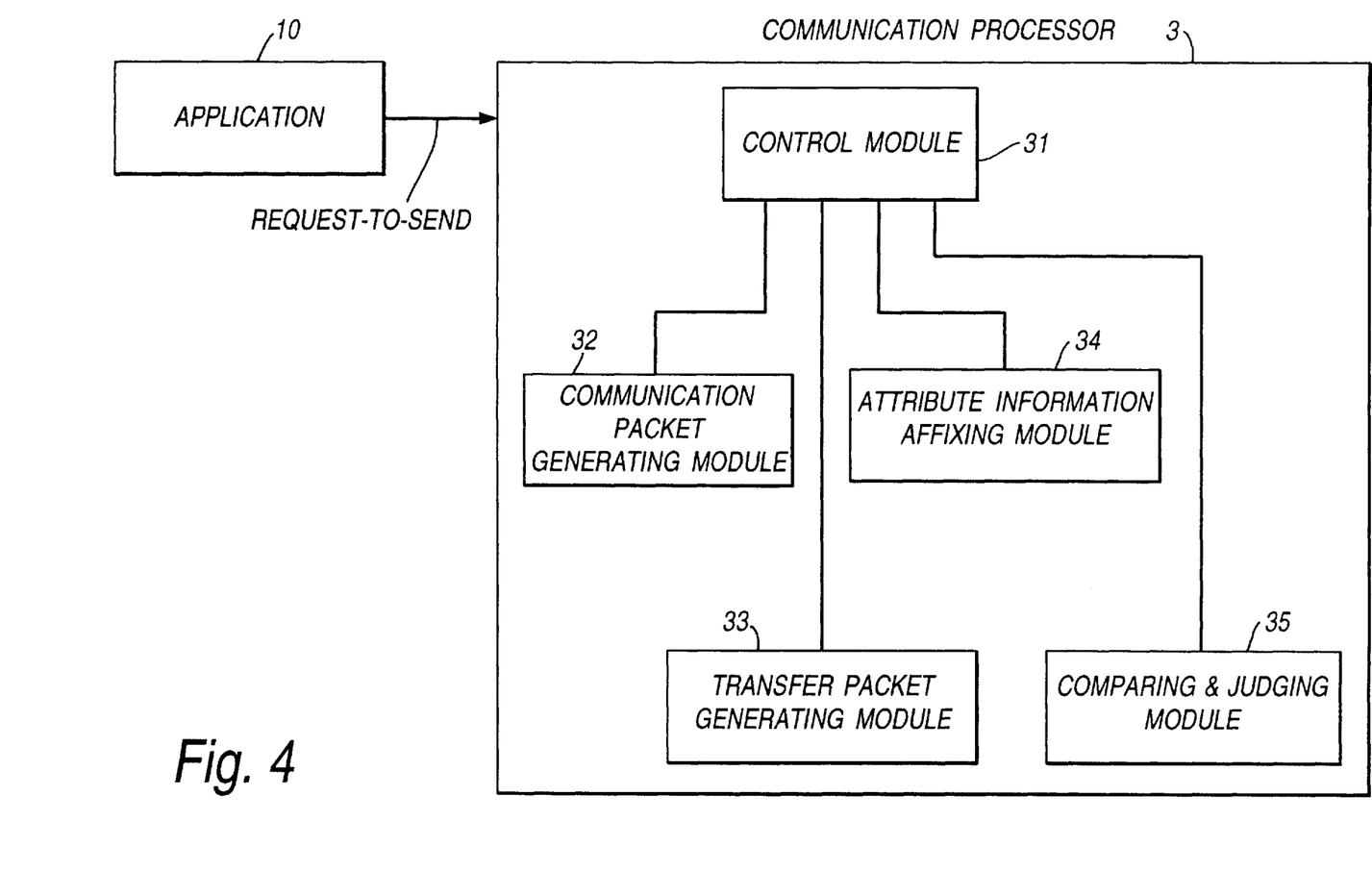
FIG. 4 is a block diagram of another preferable embodiment of a checkpoint based communication processing system according to the present invention.

FIG. 4 is a block diagram of another preferable embodiment of a checkpoint based communication processing system according to the present invention.

In this case, the checkpoint based communication system 3 includes a control module 31 and a communication packet generating module 33 which are substantially the same as the control module 21 and the communication packet generating module 23 respectively shown in FIG. 1.

The communication system 3 further includes a transfer packet generating module 33, an attribute information affixing module 34 and a relative position comparing module 35.

Figure 5:
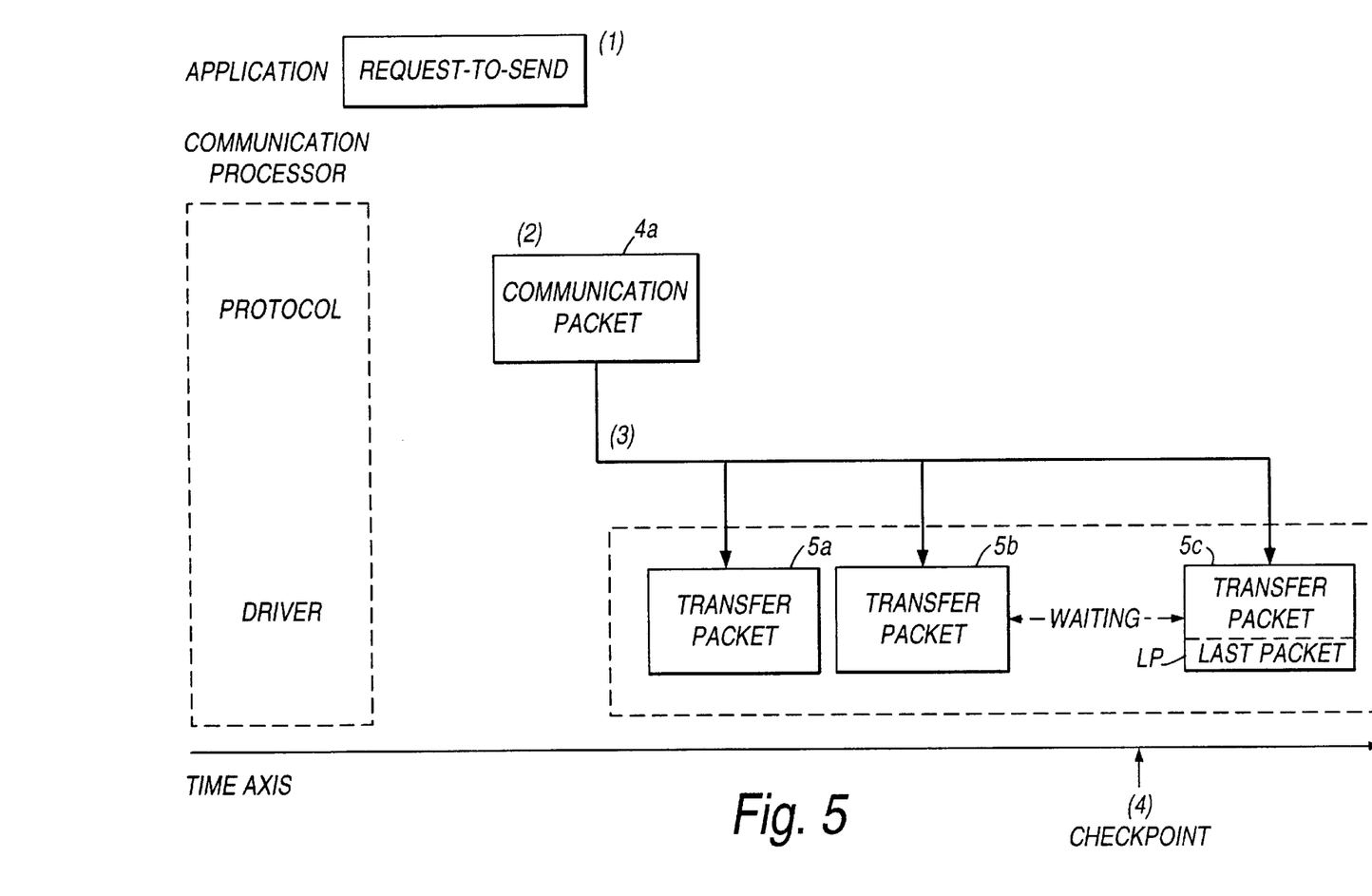
FIG. 5 is a timing chart for explaining the operational principle of the second embodiment of the checkpoint based communication processing system according to the present invention.

When a send-to-request instruction (1) from an application 10 is received as shown in FIG. 5, the control module 31 instructs the communication packet generating module 32 to generates a plurality of communication packets. As explained before, the communication packet is transferred by using in a transport layer, such as an IP packet for using in an IP layer.

In this second embodiment, an actual transfer is performed by using a data link layer. For doing so, the control module 31 instructs the transfer packet generating module 33 to generate a plurality of transfer packets by dividing a communication packet under a particular communication protocol so as to fit the size of the respective transfer packet to the transfer device or a network media.

Then the control module 31 instructs the attribute information affixing module 34 to affix a relative position information to the generated transfer packets. The relative position indicates whether the transfer packet is the last one among them. Namely, when a plurality of transfer packets are generated by dividing a communication packet, the last transfer packet only is identified among them.

FIG. 5 shows the example in which three transfer packets 5a, 5b and 5c are generated from a communication packet 4a and the last transfer packet 5c is affixed with an attribute information LP.

For performing a transfer, the control module 31 instructs the relative position comparing module 35 to check whether or not the transfer packet is the last one with affixing the attribute information. The transfer packets except the last one, like the transfer packets 5a and 5b shown in FIG. 5, are promptly transferred into a transmission line. The last transfer packet 5c only is delayed until the next checkpoint has been taken.

When a transfer has been completed, a receiving side system reconstructs the communication packet from the received transfer packet.

If a failure is detected before taking the next checkpoint (4), the last transfer packet 5c is not transferred to the receiving side. Since the transfer of the communication packet has not been completed, the receiving side sends a request signal for resending of the communication packet after detecting a certain timeout.

Figure 6:
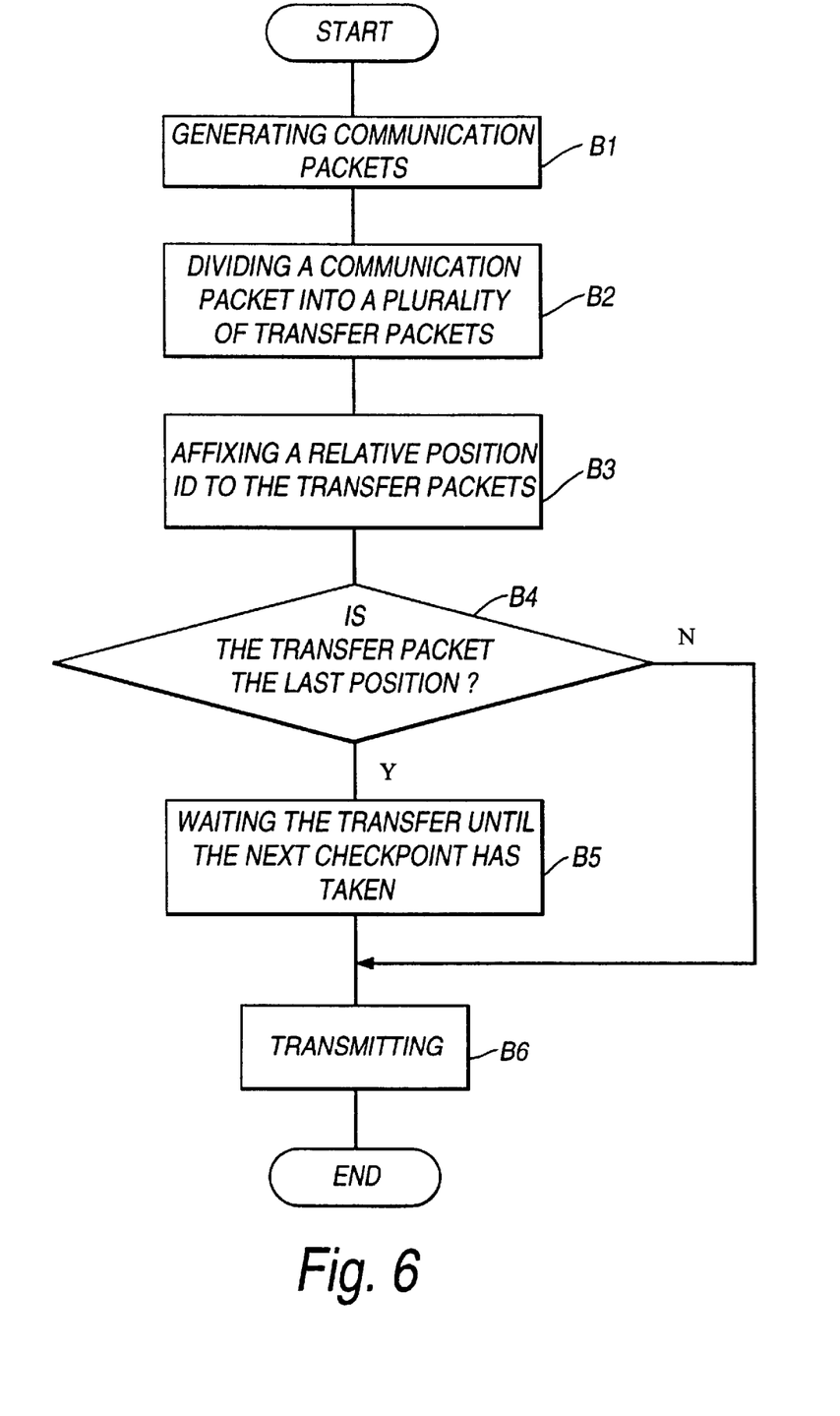
FIG. 6 is a flow chart for explaining the second method for achieving a high speed checkpoint based communication processing system according to the present invention in FIG. 5.

FIG. 6 is a flow chart for explaining the above mentioned operation. In accordance with a send-to-request from an application in the system, the control module in the communication processing system instructs the communication packet generating module to generate a plurality of transfer packets as shown as the first step B1 in FIG. 6. Further the communication packet is divided into a plurality of transfer packets at the second step B2. Then the control module instructs the attribute information affixing module to affix the information for identifying whether or not the transfer packet is the last one at the third step B3.

In an actual transfer, the control module instructs the comparing module to recognize whether the transfer packet is the last one or not at the fourth step B4. If it is not, the step goes to the sixth step B6 for transferring the transfer packet as promptly. If it is yes, the step goes to the fifth step B5 for delaying the transfer packet until the next checkpoint has taken.

As explained, the first embodiment of the checkpoint based communication processing system according to the present invention controls the processing by maintaining the checkpoint sequence number. And the second embodiment controls the processing by judging a relative position of the transfer packet. Of course, it is possible to control the communication processing by using both of the checkpoint sequence number and the information of the relative position among the plural transfer packets. For example, an ethernet packet which is generated in an ethernet driver transfer packet corresponds to the transfer packet.

What is claimed is:

1. A communication processing system able to recover from an operational failure, comprising:

a data transferring device which is operated under the control of a checkpoint mechanism; and a data receiving device;

said data transferring device comprising:

packet generating means for generating a plurality of communication packets;

sequence number incrementing means for incrementing a sequence number each time a checkpoint is taken;

affixing means for affixing attribute information including a sequence number to each communication packet, wherein the affixed sequence number corresponds to a checkpoint taken just prior said packet generation;

judging means for judging whether an affixed sequence number is different from a latest sequence number corresponding to a latest checkpoint; and control means for controlling, based on affixed sequence numbers, transfer of communication packets from said data transferring device to said data receiving device;

said control means initiating immediate transfer of said communication packet to said data receiving device if said judging means indicates that said affixed sequence number is different from said latest sequence number; and said control means delaying transfer of said communication packet to said data receiving device if said judging means indicates that said affixed sequence number is the same as said latest sequence number.

2. A communication processing system as described in claim 1;

wherein said data receiving device is not operated under the control of a checkpoint mechanism.

3. A communication processing system able to recover from an operational failure, comprising:

a data transferring device which is operated under the control of a checkpoint mechanism; and a data receiving device;

said data transferring device comprising:

transfer packet generating means for generating a plurality of transfer packets from a communication packet;

affixing means for affixing to each transfer packet attribute information including a transfer packet's position relative to a last transfer packet at the time of said transfer packet's generation;

position judging means for judging said transfer packet's position relative to said last transfer packet; and control means for controlling, based on transfer packet's position, transfer of transfer packet from said data transferring device to said data receiving device;

said control means initiating immediate transfer of said transfer packet to said data receiving device if said position judging means indicates that said transfer packet is not said last transfer packet; and said control means delaying transfer of said transfer packet to said data receiving device if said position judging means indicates that said transfer packet is said last transfer packet.

4. A communication processing system as described in claim 3;

wherein said data receiving device is not operated under the control of a checkpoint mechanism.

* * * * *